United States Patent
Iwasaki et al.

(10) Patent No.: US 8,198,846 B2
(45) Date of Patent: Jun. 12, 2012

(54) MOTOR CONTROL DEVICE

(75) Inventors: Naoya Iwasaki, Hirakata (JP); Hiroshi Takao, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 783 days.

(21) Appl. No.: 12/108,194

(22) Filed: Apr. 23, 2008

(65) Prior Publication Data
US 2008/0297078 A1 Dec. 4, 2008

(30) Foreign Application Priority Data

Apr. 26, 2007 (JP) ................. 2007-116838

(51) Int. Cl.
*H02K 29/12* (2006.01)
(52) U.S. Cl. ................. 318/400.37; 318/400.39
(58) Field of Classification Search ............... 318/139, 318/632, 400.37, 400.38, 400.39
See application file for complete search history.

(56) References Cited

U.S. PATENT DOCUMENTS

| | | | | |
|---|---|---|---|---|
| 5,980,211 A * | 11/1999 | Tojo et al. | ......... | 417/45 |
| 6,512,343 B1 * | 1/2003 | Yasohara | ......... | 318/437 |
| 6,822,417 B2 * | 11/2004 | Kawaji et al. | ......... | 318/701 |
| 7,064,514 B2 * | 6/2006 | Iwaji et al. | ......... | 318/801 |
| 2004/0222758 A1 * | 11/2004 | Tagome et al. | ......... | 318/268 |
| 2007/0013333 A1 * | 1/2007 | Ajima et al. | ......... | 318/432 |

FOREIGN PATENT DOCUMENTS

| | | |
|---|---|---|
| JP | 09-322583 | 12/1997 |
| JP | 2000102299 | 4/2000 |
| JP | 2001-008307 | 1/2001 |
| JP | 2001-008486 | 1/2001 |
| JP | 2001-008487 | 1/2001 |
| JP | 2001-128484 | 5/2001 |
| JP | 2002-238278 A | 8/2002 |
| JP | 2004-129359 | 4/2004 |
| JP | 2005278389 | 10/2005 |

* cited by examiner

*Primary Examiner* — Rina Duda
(74) *Attorney, Agent, or Firm* — NDQ&M Watchstone LLP

(57) ABSTRACT

A motor control device that controls the driving of a motor having a permanent magnet provided at a rotor has: an angle detector that detects the angle of the rotor by use of an angle sensor; a current detector that detects, as a detected current, the outflow current from or inflow current to a direct-current power source serving as the source for driving the motor; and an angle corrector that corrects the detected angle based on the detected current. The driving of the motor is controlled by use of a corrected angle obtained through the correction by the angle corrector.

9 Claims, 6 Drawing Sheets

DETECTED ANGLE LEADING

NO DEVIATION IN DETECTED ANGLE

DETECTED ANGLE LAGGING

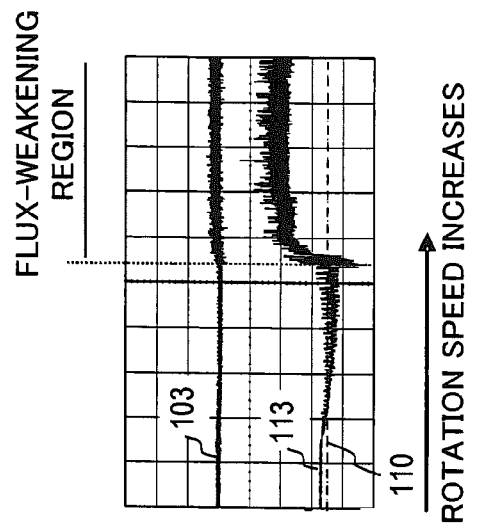
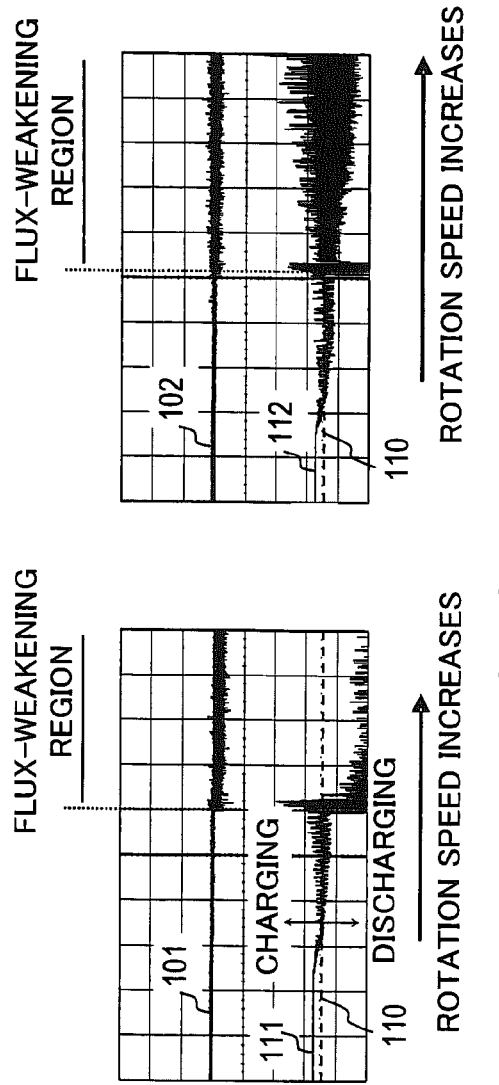

MOTOR CONTROL DEVICE

This nonprovisional application claims priority under 35 U.S.C. §119(a) on Patent Application No. 2007-116838 filed in Japan on Apr. 26, 2007, the entire contents of which are hereby incorporated by reference.

BACKGROUND OF THE INVENTION

1. Field of the Invention

The present invention relates to a motor control device and a motor drive system for controlling the driving of a motor.

2. Description of Related Art

In a motor drive system for driving a permanent-magnet synchronous motor, the angle of the rotor of the motor is often detected by use of an angle sensor. The angle of the rotor is also called the position of the rotor, or the magnetic pole position. The motor drive system incorporates a motor control device, which performs vector control based on the detected angle.

Inconveniently, in the fitting of the angle sensor to the motor, fitting errors are unavoidable. Also, under the influence of temporal changes, the errors can vary in magnitude. Fitting errors produce an error in the detected angle. Motors capable of generating high torques tend to have comparatively large number of pole pairs; in vector control, the larger the number of pole pairs a motor has, the greater the influence of the detection error is (because the larger the number of pole pairs a motor has, the larger the error in terms of electrical angle is). An error in the detected angle may cause unintended torque generation or regeneration charging, possibly causing unintended acceleration, overcharging, and other inconveniences; it also lowers the motor efficiency.

With the aim to overcome such inconveniences, there have conventionally been proposed a number of technologies for correcting the detected angle.

For example, according to one disclosed method, the back electromotive voltage generated when a motor is driven from outside is measured and, based on the back electromotive voltage, the detected angle is corrected.

According to another conventional method, while the rotor is rotating, vector control is performed with the specified d-axis current value and the specified q-axis current value both held at zero and, based on the specified d-axis voltage value and the specified q-axis voltage value during that vector control, the detected-angle correction amount (magnetic pole position correction amount) is found.

According to yet another conventional method, the detected angle is corrected such that the input electric power, which is given as the arithmetic product of the input voltage and the input current to an electric power converter, is equal to the target output, which is calculated from the specified torque and the speed.

Also known is a method according to which, when the load torque is constant, the specified d-axis current value is controlled such that the armature current is minimal and, based on the specified d-axis current value that makes the armature current minimal, the error angle is calculated to correct the detected angle (the rotation position of the magnetic poles). Further known is a method according to which, when a motor is not rotating, it is energized with direct-current power to calculate the angle correction value.

As described above, in cases where vector control is performed by use of an angle sensor, it is necessary to use one or other technology for correcting the detected rotor angle. Disadvantageously, however, conventional correction methods are not satisfactory in terms of the simplicity of configuration and processing, or in terms of practicality. Also, higher accuracy is sought in detected-angle correction.

Moreover, in a case where the fitting errors of an angle sensor is abnormally large, it is highly likely that, unintendedly, a motor generates a comparatively high torque, or regenerated electric power causes overcharging. It is therefore also necessary to use a technology for detecting such abnormalities.

SUMMARY OF THE INVENTION

According to a first aspect of the invention, a motor control device that controls the driving of a motor having a permanent magnet provided at a rotor is provided with: an angle detector that detects the angle of the rotor by use of an angle sensor; a current detector that detects, as a detected current, the outflow current from or inflow current to a direct-current power source serving as the source for driving the motor; and an angle corrector that corrects the detected angle based on the detected current. Here, the driving of the motor is controlled by use of a corrected angle obtained through the correction by the angle corrector.

Specifically, for example, in the motor control device according to the first aspect, when it is defined that the axis parallel to the direction of the magnetic flux produced by the permanent magnet is the d-axis, that the axis assumed, for control purposes, to correspond to the d-axis is the γ-axis, and that the axis perpendicular to the γ-axis is the δ-axis, there is further provided: a specified current value generator that generates a target γ-axis current value and a target δ-axis current value at which the γ-axis component and the δ-axis component of the supply current to the motor are supposed to be. Here, the angle corrector finds an angle correction value based on the detected current as detected when the target δ-axis current value is zero and simultaneously the target γ-axis current value is negative, and finds the corrected angle based on the angle correction value and the angle detected by the angle detector.

Specifically, for example, in the motor control device according to the first aspect, the angle corrector finds the angle correction value such that the detected current as detected when the target δ-axis current value is zero and simultaneously the target γ-axis current value is negative is equal to a predetermined value or is in a predetermined range including the predetermined value.

Specifically, for example, in the motor control device according to the first aspect, there is further provided: an abnormality discriminator that checks whether or not the detection by the angle detector is abnormal based on the detected current.

Specifically, for example, in the motor control device according to the first aspect, when it is defined that the axis parallel to the direction of the magnetic flux produced by the permanent magnet is the d-axis, that the axis assumed, for control purposes, to correspond to the d-axis is the γ-axis, and that the axis perpendicular to the γ-axis is the δ-axis, there is further provided: a specified current value generator that generates a target δ-axis current value at which the δ-axis component of the supply current to the motor is supposed to be, and an abnormality discriminator that checks whether or not the detection by the angle detector is abnormal based on the detected current as detected when the target δ-axis current value is zero.

Specifically, for example, in the motor control device according to the first aspect, the abnormality discriminator finds the detection by the angle detector abnormal when the detected current as detected when the target δ-axis current value is zero is out of a predetermined normal current range.

According to a second aspect of the invention, a motor control device that controls the driving of a motor having a permanent magnet provided at a rotor is provided with: an angle detector that detects the angle of the rotor by use of an angle sensor; and a current detector that detects, as a detected current, the outflow current from or inflow current to a direct-current power source serving as the source for driving the motor. Here, the driving of the motor is controlled by use of the detected angle, and there is further provided: an abnormality discriminator that checks whether or not the detection by the angle detector is abnormal based on the detected current.

Specifically, for example, in the motor control device according to the second aspect, when it is defined that the axis parallel to the direction of the magnetic flux produced by the permanent magnet is the d-axis, that the axis assumed, for control purposes, to correspond to the d-axis is the γ-axis, and that the axis perpendicular to the γ-axis is the δ-axis, there is further provided: a specified current value generator that generates a target δ-axis current value at which the δ-axis component of the supply current to the motor is supposed to be. Here, the abnormality discriminator checks whether or not the detection by the angle detector is abnormal based on the detected current as detected when the target δ-axis current value is zero.

Specifically, for example, in the motor control device according to the second aspect, the abnormality discriminator finds the detection by the angle detector abnormal when the detected current as detected when the target δ-axis current value is zero is out of a predetermined normal current range.

According to another aspect of the invention, a motor drive system is provided with: a motor; an inverter that drives the motor; and a motor control device according to any one of the aspects of the invention described above that controls the driving of the motor by controlling the inverter.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

BRIEF DESCRIPTION OF THE DRAWINGS

FIGS. 6A, 6B, and 6C are diagrams showing the relation between the angle correction value and the detected current waveforms.

DETAILED DESCRIPTION OF PREFERRED EMBODIMENTS

Figure 1:
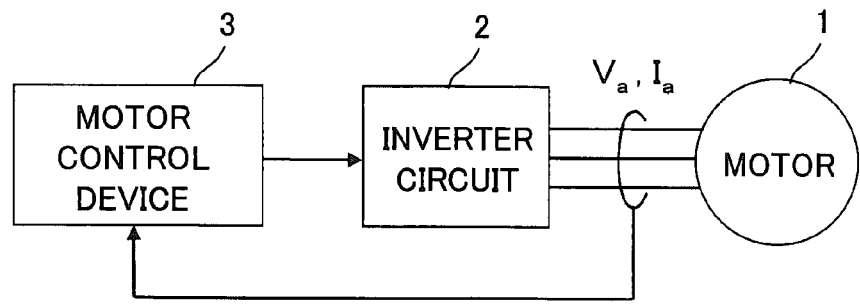
FIG. 1 is a block diagram showing an outline of a motor drive system according to an embodiment of the invention.

Hereinafter, an embodiment of the invention will be described in detail. FIG. 1 is a block diagram showing an outline of a motor drive system according to an embodiment of the invention. The motor drive system shown in FIG. 1 includes a motor 1, an inverter circuit 2, and a motor control device 3.

The motor 1 is a three-phase permanent-magnet synchronous motor; it has a rotor (unillustrated) provided with a permanent magnet, and has a stator (unillustrated) provided with three-phase armature windings.

The inverter circuit 2 feeds the motor 1 with a three-phase, namely U-, V-, and W-phase, alternating-current voltage according to a PWM (pulse-width modulation) signal fed from the motor control device 3. The overall voltage fed to the motor 1 is referred to as the motor voltage (armature voltage) $V_a$, and the overall current fed from the inverter circuit 2 to the motor 1 is referred to as the motor current (armature current) $I_a$.

The motor control device 3 monitors the motor current $I_a$ etc., and feeds the inverter circuit 2 with a PWM signal for achieving the desired vector control.

Figure 2:
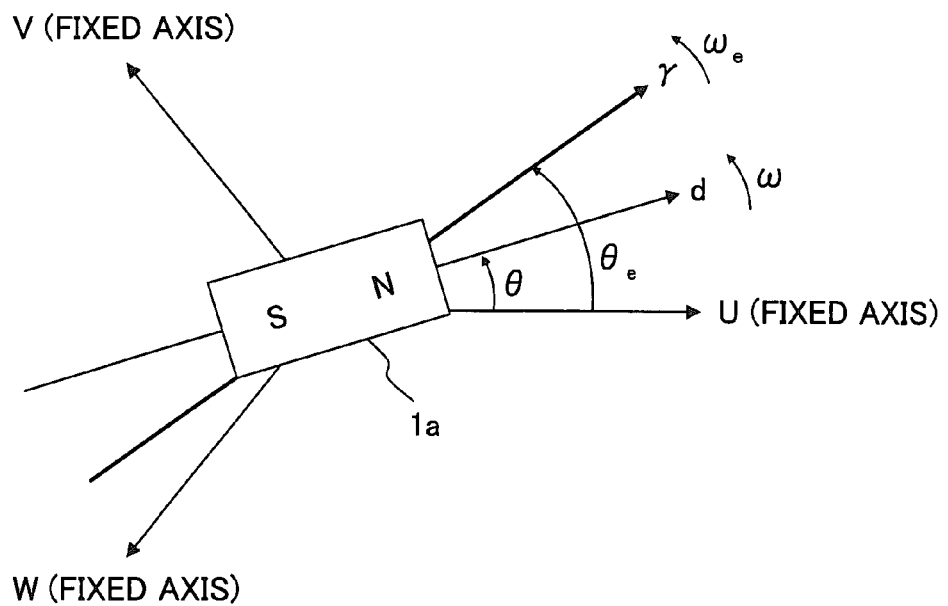
FIG. 2 is a diagram showing an analysis model of a motor according to an embodiment of the invention.

FIG. 2 is an analysis model diagram of the motor 1. In the following description, "armature windings" refer to those provided in the motor 1. In FIG. 2 are shown the U-, V-, and W-phase armature winding fixed axes. The reference sign 1a represents the permanent magnet provided at the rotor of the motor 1. In the rotating coordinate system that rotates at the same speed at which the magnetic flux produced by the permanent magnet 1a rotates, the direction of the magnetic flux produced by the permanent magnet 1a is referred to as the d-axis, and the rotating axis assumed, for control purposes, to correspond to the d-axis is referred to as the γ-axis. Moreover, although unillustrated, the axis leading the d-axis by 90-degrees in electrical angle is referred to as the q-axis, and the axis leading the γ-axis by 90-degrees in electrical angle is referred to as the δ-axis. The rotating coordinate system corresponding to the real axes have, as its coordinate axes, the d- and q-axes, which are collectively referred to as the dq-axes. The rotating coordinate system assumed for control purposes have, as its coordinate axes, the γ- and δ-axes, which are collectively referred to as the γδ-axes.

The dq-axes are rotating, and their rotation speed is represented by ω. The γδ-axes are also rotating, and their rotation speed is represented by ωe. With respect to the rotating dq-axes as observed at a given moment, the angle (phase) of the d-axis relative to the U-phase armature winding fixed axis is represented by θ. Likewise, with respect to the rotating γδ-axes as observed at a given moment, the angle (phase) of the γ-axis relative to the U-phase armature winding fixed axis is represented by $θ_e$. The angle represented by θ or $θ_e$ is an angle in terms of electrical angle, and is generally also called the rotor position, or the magnetic pole position. The rotation speed represented by ω or $ω_e$ is an angular velocity in terms of electrical angle.

The motor control device 3 performs vector control basically such that the angle θ and the angle $θ_e$ are equal, while sometimes the angle θ and the angle $θ_e$ are intentionally made different. When the angle θ and the angle $θ_e$ are equal, the d- and q-axes coincide with the γ- and δ-axes respectively.

In the following description, the γ-axis and δ-axis components of the motor voltage $V_a$ are referred to as the γ-axis voltage $v_γ$ and the δ-axis voltage $v_δ$ respectively, and the γ-axis, δ-axis, d-axis, and q-axis components of the motor current $I_a$ are referred to as the γ-axis current $i_γ$, δ-axis current $i_δ$, d-axis current $i_d$, and q-axis current $i_q$ respectively.

The specified voltage values representing the target values of the γ-axis voltage $v_γ$ and the δ-axis voltage $v_δ$ are referred to as the specified γ-axis voltage value $v_γ^*$ and the specified δ-axis voltage value $v_δ^*$ respectively. The specified current values representing the target values of the γ-axis current $i_\gamma$ and the δ-axis current $i_\delta$ are referred to as the specified γ-axis current value $i_\gamma^*$ and the specified δ-axis current value $i_\delta^*$ respectively. What is represented by $v_\delta^*$ may be called the target γ-axis voltage value targeted by $v_\gamma$, and what is represented by $v_\gamma^*$ may be called the target δ-axis voltage value targeted by $v_\delta$. What is represented by $i_\gamma^*$ may be called the target γ-axis current value targeted by $i_\gamma$, and what is represented by $i_\delta^*$ may be called the target δ-axis current value targeted by $i_\delta$.

The motor control device 3 performs vector control such that the values of the γ-axis voltage $v_\gamma$ and the δ-axis voltage $v_\delta$ follow the specified γ-axis voltage value $v_\gamma^*$ and the specified δ-axis voltage value $v_\delta^*$ respectively, and that the values of the γ-axis current $i_\gamma$ and the δ-axis current $i_\delta$ follow the specified γ-axis current value $i_\gamma^*$ and the specified δ-axis current value $i_\delta^*$ respectively.

The U-phase, V-phase, and W-phase components of the motor voltage $V_a$ are represented by specified three-phase voltage values consisting of a specified U-phase voltage value $v_u^*$, a specified V-phase voltage value $v_v^*$, and a specified W-phase voltage value $v_w^*$.

Moreover, in the following description, $R_a$ represents the motor resistance (the resistance of the armature windings of the motor 1); $L_d$ and $L_q$ represent the d-axis inductance (the d-axis component of the inductance of the armature windings of the motor 1) and the q-axis inductance (the q-axis component of the inductance of the armature windings of the motor 1) respectively; and $\Phi_a$ represents the armature flux linkage ascribable to the permanent magnet 1a. The values of $L_d$, $L_q$, $R_a$, and $\Phi_a$ are determined at the time of fabrication of the motor drive system, and these values are used in the calculations performed by the motor control device 3.

Throughout the present specification, for the sake of simplicity of description, any quantity of state or the like may be referred to by its symbol alone, in which case the symbol should be understood to represent the quantity itself, for example, "$i_\gamma$" denotes the same thing as "the γ-axis current $i_\gamma$".

Figure 3:
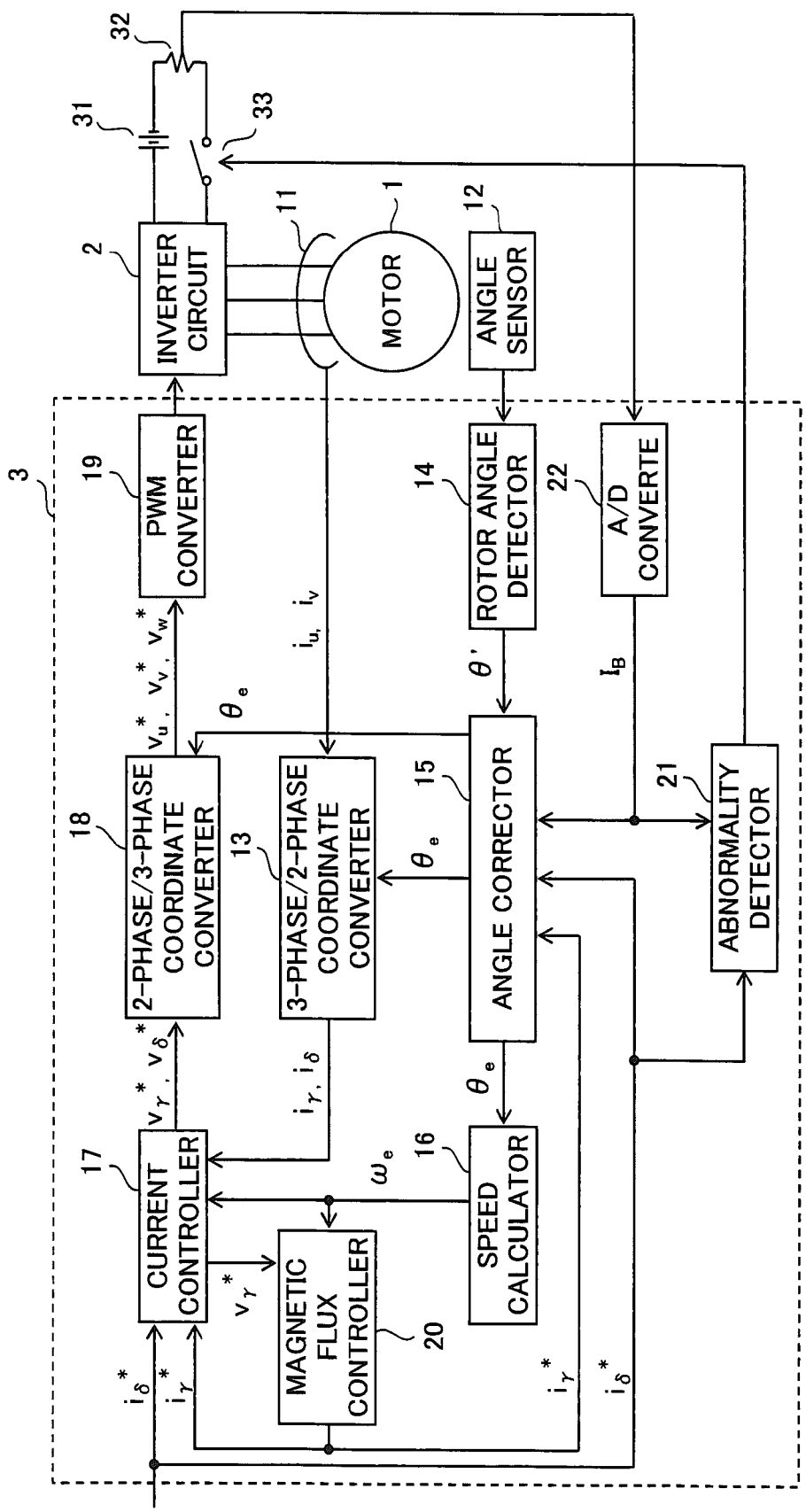
FIG. 3 is a block diagram showing the details of a motor drive system according to an embodiment of the invention.

FIG. 3 is a block diagram showing the details of the motor drive system shown in FIG. 1. As shown in FIG. 3, the motor drive system includes—in addition to the motor 1, the inverter circuit 2, and the motor control device 3—a phase current sensor 11, an angle sensor 12, a direct-current source 31, a current sensor 32, and a switch 33. The motor control device 3 is composed of different functional blocks represented by reference signs 13 to 22. The motor control device 3 may be thought of as including, within itself, any one or more of the phase current sensor 11, the angle sensor 12, the current sensor 32, and the switch 33. The different functional blocks within the motor control device 3 can freely use the values generated within the motor control device 3.

The phase current sensor 11 detects the fixed-axis components of the motor current $I_a$ fed from the inverter circuit 2 to the motor 1, namely a U-phase current $i_u$ and a V-phase current $i_v$. Here, the W-phase current $i_w$ is calculated according to the relation formula "$i_w = -i_u - i_v$". Thus, $i_u$, $i_v$, and $i_w$ represents the currents through the U-phase, V-phase, and W-phase armature winding in the stator of the motor 1.

A three-phase/two-phase coordinate converter 13 (hereinafter referred to simply as the coordinate converter 13) converts, by using the angle $\theta_e$ fed from an angle corrector 15, the U-phase current $i_u$ and the V-phase current $i_v$ into the γ-axis current $i_\gamma$ and the δ-axis current $i_\delta$, and feeds the γ-axis current $i_\gamma$ and the δ-axis current $i_\delta$ thus obtained through the conversion to a current controller 17.

The current controller 17 receives, from an unillustrated specified δ-axis current value generator, the specified δ-axis current value $i_\delta^*$, and receives, from a magnetic flux controller 20, a specified γ-axis current value $i_\gamma^*$. The specified δ-axis current value generator generates $i_\delta^*$ such that the motor 1 generates a desired torque. Alternatively, for example, $i_\delta^*$ may be generated based on a specified motor speed value $\omega^*$ fed from an unillustrated CPU (central processing unit) or the like and the rotation speed $\omega_e$ calculated by a speed calculator 16. In this case, the specified δ-axis current value generator generates, by use of proportional-plus-integral control or the like, $i_\delta^*$ such that the speed error $(\omega^* - \omega_e)$ is equal to zero.

The current controller 17 monitors $i_\gamma^*$, $i_\delta^*$, $i_\gamma$, and $i_\delta$ fed to it, and performs, by use of proportional-plus-integral control or the like, current feedback control such that $(i_\gamma^* - i_\gamma)$ and $(i_\delta^* - i_\delta)$ both converge to zero. Here, by use of decoupling control for eliminating interference between the γ-axis and the δ-axis, the specified γ-axis voltage value $v_\delta^*$ and the specified δ-axis voltage value $v_\delta^*$ are calculated such that $(i_\delta^* - i_\gamma)$ and $(i_\delta^* - i_\delta)$ both converge to zero. Also monitored for the calculation of $v_\gamma^*$ and $v_\delta^*$ is $\omega_e$ calculated by the speed calculator 16.

A two-phase/three-phase coordinate converter 18 (hereinafter referred to simply as the coordinate converter 18) converts, by using the angle $\theta_e$ fed from the angle corrector 15, the specified voltage values $v_\gamma^*$ and $v_\delta^*$ on the γδ-axes into the specified three-phase voltage values ($v_u^*$, $v_v^*$, and $v_w^*$).

A PWM converter 19 generates a PWM signal that is pulse-width-modulated according to the specified three-phase voltage values ($v_u^*$, $v_v^*$, and $v_w^*$) from the coordinate converter 18, and feeds the thus generated PWM signal to the inverter circuit 2. The inverter circuit 2 feeds, according to the PWM signal fed to it, the motor current $I_a$ to the motor 1 and thereby drives the motor 1. More specifically, the inverter circuit 2 is provided with half-bridge circuits—for three phases individually—and a driver (none of these are illustrated); according to the PWM signal, the driver turns on and off a switching device provided in each half-bridge circuit, so that the motor current $I_a$ according to the specified three-phase voltage values is fed to the motor 1.

The angle sensor 12 comprises, for example, a Hall device or a resolver, and outputs a signal that identifies the magnetic pole position of the permanent magnet 1a (that is, a signal that identifies the angle θ).

From the output signal of the angle sensor 12, a rotor angle detector 14 detects the angle (phase) of the d-axis with respect to the U-phase armature winding fixed axis. The detected angle should ideally be completely equal to θ in FIG. 2; in reality, however, under the influence of errors in the fitting of the angle sensor 12 and temporal changes, the detected angle often deviates from θ. Accordingly, as opposed to the angle θ, the angle detected by the rotor angle detector 14 is represented by θ'.

The angle corrector 15 corrects the detected angle θ' and thereby calculates the $\theta_e$ in FIG. 2. Thus, the angle $\theta_e$ can also be called the corrected angle. The method for correcting the detected angle θ' will be described later. The calculated angle $\theta_e$ is fed to the coordinate converters 13 and 18 and to the speed calculator 16.

The speed calculator 16 integrates the angle $\theta_e$ and thereby calculates the rotation speed $\omega_e$ (in other words, it calculates the rotation speed $\omega_e$ based on the variation of the angle $\theta_e$ per unit time). The calculated rotation speed $\omega_e$ is fed to the current controller 17 and to the magnetic flux controller 20.

Based on the rotation speed $\omega_e$, and based also on the specified γ-axis voltage value $v_\gamma^*$ from the current controller 17, the magnetic flux controller 20 sets the specified γ-axis current value $i_\gamma^*$, and feeds the thus set $i_\gamma^*$ to the angle corrector 15 and to the current controller 17. The motor control device 3 can perform a plurality of types of vector control on the motor 1. The plurality of types of vector control include, for example, maximum torque control and flux-weakening control. In a case where the motor 1 is a non-salient pole machine as exemplified by a surface permanent-magnet synchronous motor, when maximum torque control is performed, $i_\gamma^*$ is made equal to zero; when flux-weakening control is performed, $i_\gamma^*$ is made negative. A negative d-axis current (γ-axis current) acts to reduce the magnetic flux in the d-axis direction. Typically, flux-weakening control is performed to keep the motor voltage $V_a$ equal to or less than a predetermined limit voltage when the rotation speed ω (or $ω_e$) is high.

When flux-weakening control is performed, the magnetic flux controller 20 sets $i_\gamma^*$ according to, for example, formula (1a) or (1b) below. Formulae (1a) and (1b) are disclosed in JP-A-2006-204054 as formulae for calculating specified current values in flux-weakening control. When formula (1a) is used, $i_\gamma^*$ is set by use also of $i_\gamma$ calculated by the coordinate converter 13. Here, $V_{om}$ represents the limit voltage set based on the output voltage of the direct-current source 31. Alternatively, $i_\gamma^*$ may be set according to formula (1c), which is generally known as one for calculating specified current values in flux-weakening control.

$$i_\gamma^* = -\frac{\Phi_a}{L_d} + \frac{1}{\omega_e L_d}\sqrt{V_{om}^2 - (v_\gamma^* - R_a \cdot i_\gamma)^2} \quad (1a)$$

$$i_\gamma^* = -\frac{\Phi_a}{L_d} + \frac{1}{\omega_e L_d}\sqrt{V_{om}^2 - v_\gamma^{*2}} \quad (1b)$$

$$i_\gamma^* = -\frac{\Phi_a}{L_d} + \frac{1}{\omega_e L_d}\sqrt{V_{om}^2 - (\omega_e L_q i_\delta)^2} \quad (1c)$$

The direct-current source 31 comprises, for example, a secondary battery (for example, a lithium-ion battery); thus, it can not only discharge electric power but also be charged with it. When the direct-current source 31 discharges, the discharged electric power is fed through the inverter circuit 2 to the motor 1, where the discharged electric power is converted into kinetic energy to drive the rotor to rotate. On the other hand, during regeneration, the electric power generated by the motor 1 is, as regenerated electric power, returned through the inverter circuit 2 to the direct-current source 31, which is thereby charged.

The current sensor 32 outputs an analog signal commensurate with the value of the output current of the direct-current source 31. An A/D (analog-to-digital) converter 22 performs analog-to-digital conversion on the analog output signal of the current sensor 32 to output a detected current $I_B$ that represents the output current of the direct-current source 31 (the value of the output current). The current sensor 32 is, for example, a shunt resistor connected in series with the line across which the output current of the direct-current source 31 flows. During the discharging of the direct-current source 31, a discharge current flows out of the direct-current source 31; the polarity of the detected current $I_B$ in this state is regarded to be negative. During the charging of the direct-current source 31, a charge current flows into the direct-current source 31; the polarity of the detected current $I_B$ in this state is regarded to be positive.

The switch 33 is a switching device, such as a field-effect transistor or a relay, and is connected in series with the line across which the output current of the direct-current source 31 flows. As will be described in detail later, the switch 33 is turned on and off by an abnormality detector 21. Normally, the switch 33 is on so that the discharged electric power from the direct-current source 31 is fed to the motor 1, or that the regenerated electric power from the motor 1 is fed to the direct-current source 31. When the switch 33 is off, the direct-current source 31 and the inverter circuit 2 are disconnected from each other so that no current flows any longer through the armature windings of the motor 1.

Description of the Angle Corrector: Now, as a function unique to the motor drive system of the embodiment under discussion, the method for correcting the detected angle θ' will be described.

Figure 4C:
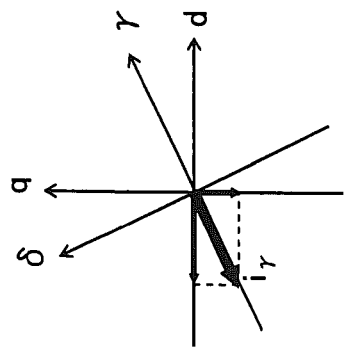
FIGS. 4A, 4B, and 4C are current vector diagrams illustrating the principle of the angle correction method adopted in the angle corrector shown in FIG. 3.
Figure 4B:
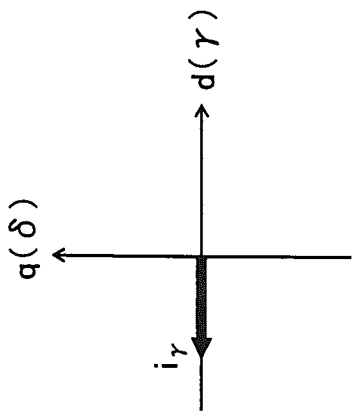
Figure 4A:
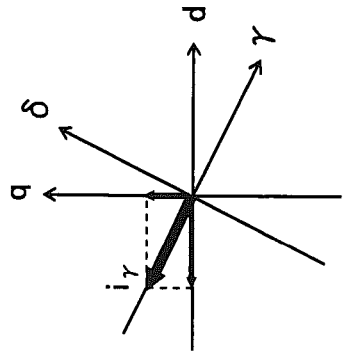

First, with reference to FIGS. 4A, 4B, and 4C, which are current vector diagrams, the principle of the correction here will be described. In FIGS. 4A to 4C, the counter-clockwise direction is the direction in which the phase leads. For the sake of simplicity, the following description of the principle assumes that θ'=$θ_e$. Suppose now that $i_δ^*$ is equal to zero and simultaneously $i_\gamma^*$ is negative. In this case, the current feedback control by the motor control device 3 so operates that $i_δ$ is equal to zero and $i_\gamma$ is negative.

And in this case, if the detected angle θ' is completely equal to the angle θ that should ideally be detected, the current vector diagram is as shown in FIG. 4B, and thus no q-axis current $i_q$ flows through the motor 1. If the detected angle θ' is lagging behind the angle θ that should ideally be detected, the current vector diagram is as shown in FIG. 4A, and thus, in reality, a positive q-axis current $i_q$ flows. When a positive q-axis current $i_q$ flows, the motor 1 generates torque. By contrast, if the detected angle θ' is leading ahead of the angle θ that should ideally be detected, the current vector diagram is as shown in FIG. 4C, and thus, in reality, a negative q-axis current $i_q$ flows. When a negative q-axis current $i_q$ flows, regeneration is occurring.

To pass a positive q-axis current $i_q$ through the motor 1 to make it generate torque, the direct-current source 31 needs to be discharging. Thus, in this case, the detected current $I_B$ is negative. On the other hand, when regeneration is occurring with a negative q-axis current $i_q$ flowing, a charge current is fed to the direct-current source 31. Thus, in this case, the detected current $I_B$ is positive. Accordingly, based on the detected current $I_B$, it is possible to identify the relation between the detected angle θ' and the angle θ that should ideally be detected.

Taking this relation into consideration, the angle corrector 15 monitors $i_\gamma^*$ and $i_δ^*$, and sets, based on the detected current $I_B$, an angle correction value $θ_C$ for the detected angle θ', and then calculates, based on the detected angle θ' and the angle correction value $θ_C$, the angle $θ_e$.

Figure 5:
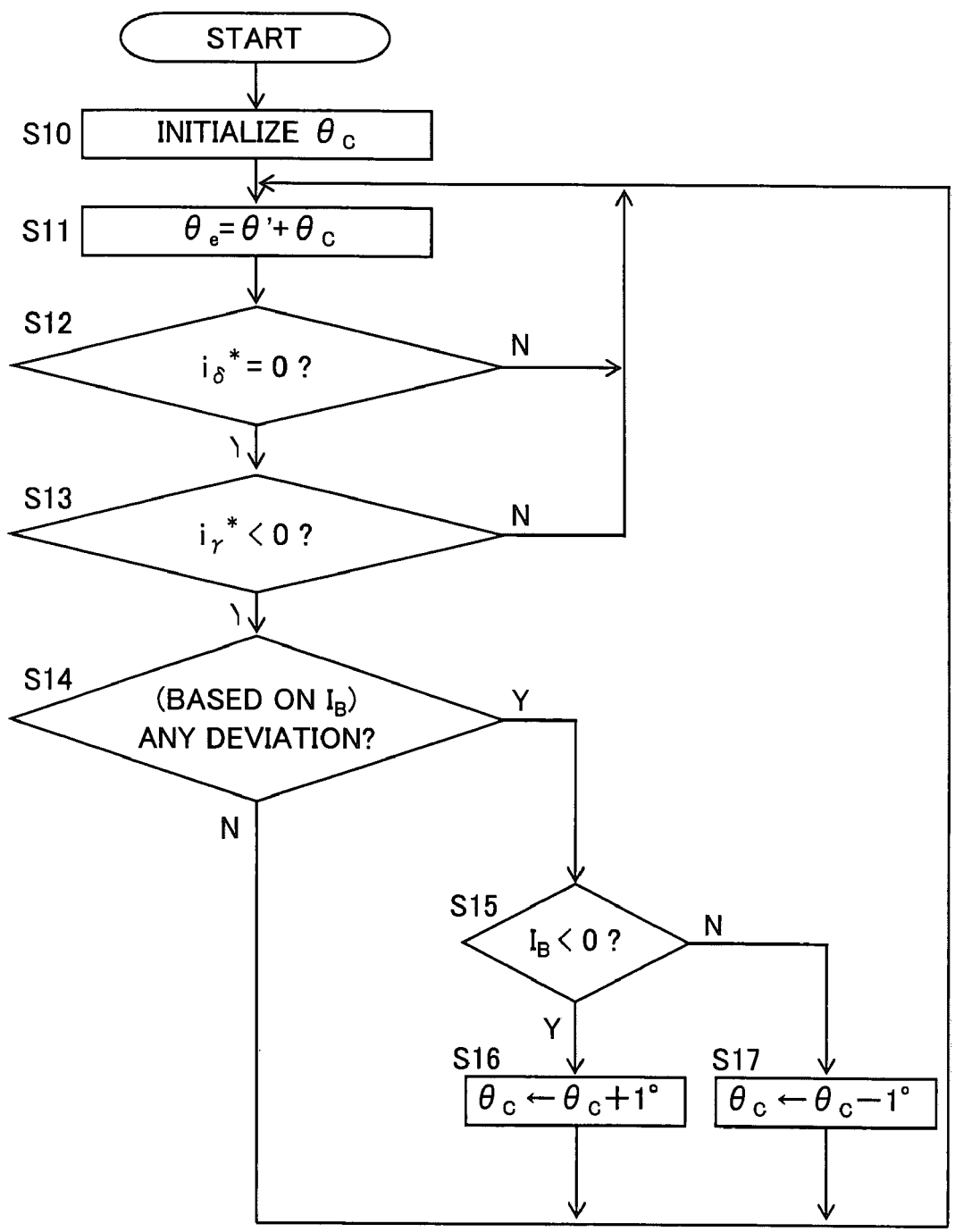
FIG. 5 is a flow chart showing the flow of the operation performed by the angle corrector shown in FIG. 3.

Now, with reference to FIG. 5, the operation of the angle corrector 15, including the processing for the correction of the detected angle θ', will be described. FIG. 5 is a flow chart showing the flow of this operation. The processing in steps S10 through S17 is executed by the angle corrector 15. The values ($I_B$, $i_\gamma^*$, $i_δ^*$, θ', $θ_C$, $θ_e$, etc) needed in the vector control by the motor control device 3 are updated constantly at predetermined time intervals, and the processing in steps S10 through S17 is executed by use of those values as obtained most recently.

First, in step S10, the angle correction value $θ_C$ is initialized. For example, as an initial value, 0° is substituted in $θ_C$. Next, in step S11, (θ'+$θ_C$) is substituted in $θ_e$, and the value of $θ_e$ obtained through this substitution is outputted from the angle corrector 15.

Next, in step S12, whether or not $i_δ^*$ is equal to zero is checked. If $i_δ^*$ is equal to zero, the flow then proceeds to step S13; if $i_δ^*$ is not equal to zero, the flow returns to step S11. In step S13, whether or not $i_\gamma^*$ is negative is checked. If $i_\gamma^*$ is negative, the flow proceeds to step S14; if $i_\gamma^*$ is not negative, the flow returns to step S11. For example, when the rotor of the motor 1 is rotating by inertia and the motor control device 3 is performing flux-weakening control, or when the rotor of the motor 1 is being rotated by a force given from outside and the motor control device 3 is performing flux-weakening control, then $i_\delta^*=0$ and simultaneously $i_\gamma^*<0$, and thus the flow proceeds to step S140.

In step S14, based on the detected current $I_B$, the angle (corrected angle) $\theta_e$ is checked for a deviation. As will be understood from the branching in steps S12 and S13, the detected current $I_B$ used to check for a deviation is that as observed when $i_\delta^*=0$ and simultaneously $i_\gamma^*<0$.

Specifically, if the detected current $I_B$ (that is, the current value as represented by $I_B$) is equal to a predetermined value $I_{REF}$ or is within a predetermined range including the predetermined value $I_{REF}$, it is judged that the angle $\theta_e$ does not deviate from the angle $\theta$, and the flow returns from step S14 to step S11; otherwise, it is judged that angle $\theta_e$ deviates from the angle $\theta$, and the flow proceeds from step S14 to step S15.

Typically, the predetermined value $I_{REF}$ is equal to, for example, zero, it may instead be a value not equal to but close to zero. A predetermined range including a predetermined value $I_{REF}$ denotes a range between $I_{REF1}$ and $I_{REF2}$ (where $I_{REF1}<I_{REF}<I_{REF2}$).

In step S15, whether or not $I_B<0$ is checked, that is, whether or not the detected current $I_B$ is negative is checked. If the detected current $I_B$ is negative, a positive q-axis current $i_q$ is supposed to be flowing (see FIG. 4A); thus, to advance the phase of the angle $\theta_e$ as the corrected angle, in step S16, 1° is added to the current angle correction value $\theta_C$, and the flow returns to step S11. By contrast, if the detected current $I_B$ is positive, a negative q-axis current $i_q$ is supposed to be flowing (see FIG. 4C); thus, in step S17, 1° is subtracted from the current angle correction value $\theta_C$, and the flow returns to step S11.

Through the repetition of the loop from step S11 through step S17, the angle correction value $\theta_C$ is adjusted such that the detected current $I_B$ as observed when $i_\delta^*=0$ and simultaneously $i_\gamma^*<0$ is equal to the predetermined value $I_{REF}$ or is within a predetermined range including the predetermined value $I_{REF}$. The thus set angle correction value $\theta_C$ is stored in a memory (unillustrated) provided within the motor control device 3.

FIGS. 6A, 6B, and 6C show the results of experiments conducted with the motor drive system shown in FIG. 3. In FIGS. 6A to 6C, the horizontal axis represents time; the reference signs 101 to 103 indicate the output voltage waveform of the direct-current source 31; the reference signs 111 to 113 indicate the current waveform of the detected current $I_B$. FIGS. 6A to 6C show those waveforms as observed when the angle correction value $\theta_C$ is equal to 10°, 15°, and 20° respectively. The broken line indicated by the reference sign 110 is the reference line for the current waveform. When the current waveform indicated by the reference signs 111 to 113 overlaps the reference line 110, the value of the detected current $I_B$ is equal to zero, the region above the reference line 110 corresponding to the state in which the detected current $I_B$ is positive (that is, charging is taking place), the region below the reference line 110 corresponding to the state in which the detected current $I_B$ is negative (that is, discharging is taking place).

FIGS. 6A to 6C each show the results of an experiment that proceeded as follows: starting in a state where the rotation speed of the motor 1 is comparatively low and flux-weakening control is not performed, the rotation speed of the motor 1 was gradually increased until it reached the flux-weakening region. The flux-weakening region denotes the region of speed in which flux-weakening control is performed; in the flux-weakening region, $i_\delta^*$ is kept equal to zero and in addition $i_\gamma^*$ is kept negative.

FIGS. 6A to 6C all correspond to a state in which, due to errors such as those in the fitting of the angle sensor 12, the angle correction value $\theta_C$ that should ideally be set is 15°.

Accordingly, in a case where the angle correction value $\theta_C$ is set at 10°, as the rotation speed $\omega$ (or $\omega_e$) increases and reaches the flux-weakening region, as represented by the current waveform 111 in FIG. 6A, the polarity of the detected current $I_B$ becomes negative. Thus, through the branching in steps S12 to S15 in FIG. 5, the flow proceeds to step S16, where the angle correction value $\theta_C$ is increased. Eventually, when the angle correction value $\theta_C$ becomes equal to 15° (corresponding to FIG. 6B), it is judged that the angle $\theta_e$ no longer deviates from the angle $\theta$.

By contrast, in a case where the angle correction value $\theta_C$ is set at 20°, as the rotation speed $\omega$ (or $\omega_e$) increases and reaches the flux-weakening region, as represented by the current waveform 113 in FIG. 6C, the polarity of the detected current $I_B$ becomes positive. Thus, through the branching in steps S12 to S15 in FIG. 5, the flow proceeds to step S17, where the angle correction value $\theta_C$ is decreased. Eventually, when the angle correction value $\theta_C$ becomes equal to 15° (corresponding to FIG. 6B), it is judged that the angle $\theta_e$ no longer deviates from the angle $\theta$.

As will be understood from the current waveforms 111 to 113, the value of the detected current $I_B$ may oscillate with a comparatively large amplitude; thus, the branching in steps S14 and S15 (and in S22 in FIG. 7, which will be described later) may be performed based on a value obtained by smoothing the actual value of the detected current $I_B$.

As described above, by use of the angle corrector 15, it is possible to automatically correct the detected angle while the motor 1 is rotating with a simple configuration and with simple processing. Since the correction of the angle can be performed whenever desired during the actual operation of the motor drive system, it is possible to cope even with temporal changes or the like. Moreover, there is no need for complicated hardware for the measurement of a back electromotive voltage as is required by the method disclosed in Japanese Patent No. 3724060. Moreover, there is no need to pass extra current to adjust the angle correction value $\theta_C$, and this adjustment can instead be performed in the normal operating state.

Moreover, the correction accuracy is free from degradation ascribable to errors in motor parameters (such as $L_d$, $L_q$, and $\Phi_a$) and the like, and thus the correction can be performed with high accuracy. In addition, as the absolute value of $i_\gamma^*$ as observed when $i_\delta^*$ is equal to zero is increased, the magnitude of the detected current $I_B$ with respect to a given error between the angles $\theta_e$ and $\theta$ increases. Thus, by increasing the absolute value of $i_\gamma^*$ as observed when $i_\delta^*$ is equal to zero, it is possible to increase the detection sensitivity to the error (increase the S/N ratio in terms of error detection). It is thereby possible to further increase the correction accuracy.

The higher the torque performance or speed performance sought in the motor 1 is, the larger the current fed to the motor 1 needs to be. In a system where the motor 1 is fed with large current, even a minute angle deviation cause a major problem. In particular, an axis deviation (an error between $\theta_e$ and $\theta$) in the high-speed rotation region tends to cause a notable problem. The correction method of this embodiment can correct the detected angle with high accuracy, and is therefore especially useful in a system where the motor 1 is fed with large current or in operation in the flux-weakening region.

In a case where the corrected angle $\theta_e$ is completely equal to the d-axis angle $\theta$, if $i_\delta^*$ is equal to zero, no current related to torque flows through the motor 1, and thus the detected current $I_B$ is approximately equal to zero. In this case, however, if $i_\gamma^*<0$, to pass a d-axis current $i_d$, the direct-current source 31 outputs a small current in the consuming direction (that is, $I_B$ takes a small negative value). In view of this, the predetermined value $I_{REF}$ used in the check for a deviation in step S14 in FIG. 5 should be a negative value close to zero. As described above, however, the predetermined value $I_{REF}$ is typically set at, for example, zero. With $I_{REF}$ set at zero, when $i_\delta^*=0$ and simultaneously $i_\gamma^*<0$, the angle correction value $\theta_C$ is so adjusted that regeneration charging is performed to a small degree. While overcharging of the direct-current source 31 is undesirable, generation of an unintended torque may cause a serious accident. Setting $I_{REF}$ at zero acts to reduce the likeliness of an unintended torque being generated (that is, it acts to increase the safety of the motor drive system). Accordingly, setting $I_{REF}$ at zero (or a positive value close to zero) is preferable to setting it at a negative value.

Figure 7:
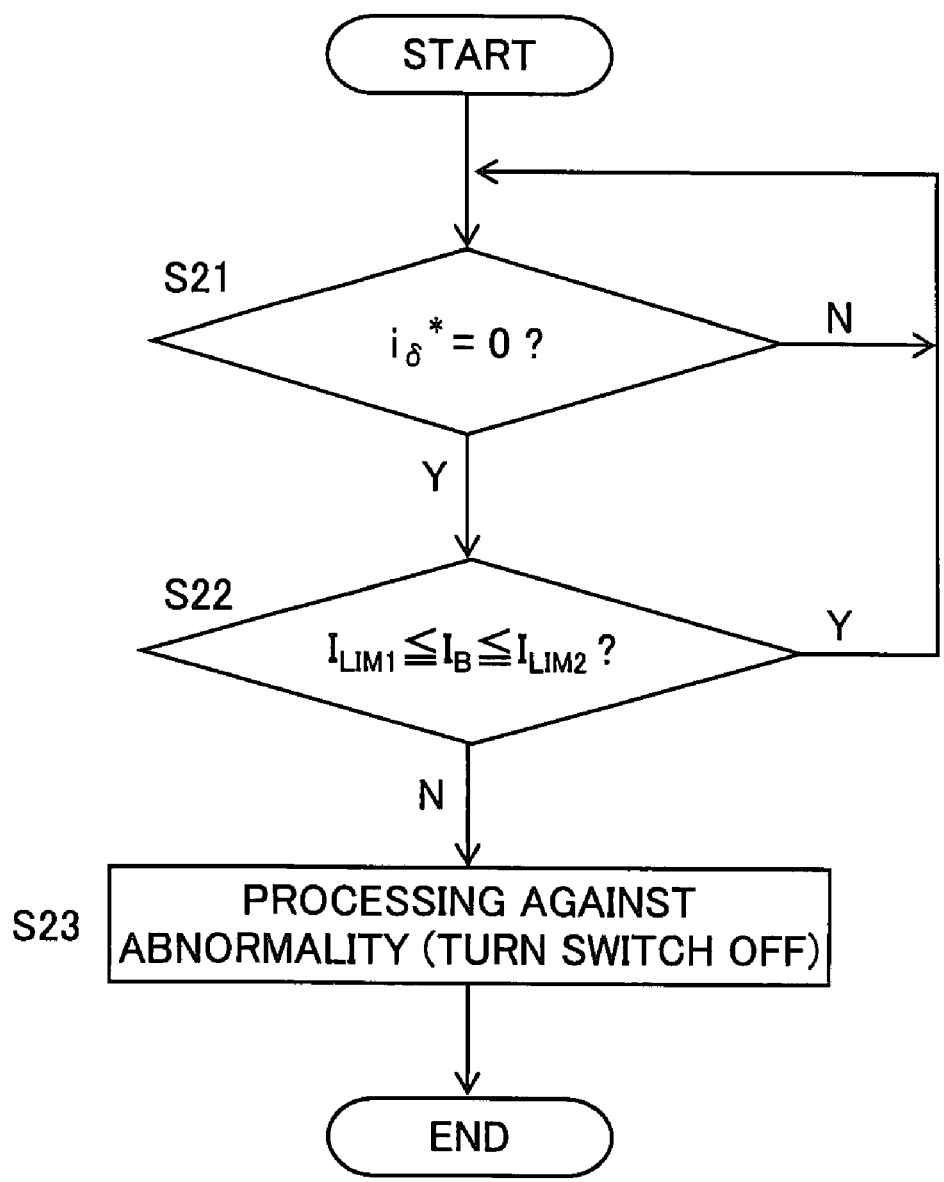
FIG. 7 is a flow chart showing the flow of the operation performed by the abnormality detector shown in FIG. 3.

Description of the Abnormality Detector: Next, with reference to FIG. 7, the function of the abnormality detector 21 shown in FIG. 3 will be described. FIG. 7 is a flow chart showing the flow of the operation of the abnormality detector 21. The abnormality detector 21 monitors the specified δ-axis current value $i_\delta^*$ and the detected current $I_B$, and performs the processing in steps S21 through S23 in FIG. 7.

First, in step S21, the abnormality detector 21 checks whether or not $i_\delta^*$ is equal to zero. Unless $i_\delta^*$ is equal to zero, the flow repeats step S21; if $i_\delta^*$ is equal to zero, the flow proceeds to step S22, where whether or not the detected current $I_B$ is within a predetermined normal current range. Specifically, here, it is checked whether or not the current value represented by $I_B$ is equal to or more than a predetermined lower limit current value $I_{LIM1}$ but equal to or less than a predetermined upper limit current value $I_{LIM2}$. Here, the lower limit current value $I_{LIM1}$ is a previously defined negative value and the upper limit current value $I_{LIM2}$ is a previously defined positive value; moreover, in relation to $I_{REF1}$ and $I_{REF2}$ mentioned previously, they fulfill the relation $I_{LIM1}<I_{REF1}<I_{REF2}<I_{LIM2}$.

If the relation $I_{LIM1}\leq I_B\leq I_{LIM2}$ holds, it is judged that the angle detection by the angle sensor 12 and the rotor angle detector 14 is normal, and the flow returns to step S21. By contrast, if the relation $I_{LIM1}\leq I_B\leq I_{LIM2}$ does not hold, it is judged that the angle detection by the angle sensor 12 and the rotor angle detector 14 is abnormal, and the flow proceeds to step S23, where processing against the abnormality is performed. This processing includes turning off the switch 33 to stop the rotation of the motor 1 (rotor) and sending off an indication that the angle detection is abnormal. Needless to say, the switch 33 stays on until the flow reaches step S33.

A slight deviation in the detected angle $\theta'$ can be absorbed by the angle correction processing performed by the angle corrector 15, but it is likely that an extremely large error cannot be corrected effectively. Moreover, a large deviation in the detected angle $\theta'$ may cause generation of an unintended comparatively high torque in the motor 1 or cause overcharging of the direct-current source 31. On the other hand, when the detected angle $\theta'$ based on the output signal of the angle sensor 12 has no large deviation, if $i_\delta^*$ is equal to zero, the output current of the direct-current source 31 is not large; when the detected angle $\theta'$ has a large deviation, even if the specified δ-axis current value $i_\delta^*$ is equal to zero, a large current may flow through the direct-current source 31. In view of these relations, as described previously, a check for an abnormality is performed based on the detected current $I_B$ as observed when $i_\delta^*=0$, and processing against an abnormality is performed whenever necessary.

In this way, it is possible to detect abnormal angle detection when the motor 1 is rotating and to stop the motor 1 safely in the event of an abnormality. Moreover, to detect abnormal angle detection, there is no need to pass extra current; thus, it is possible to detect an abnormality in the normal operating state.

A state in which, when $i_\delta^*$ is equal to zero, the relation $I_{LIM1}<I_B<I_{LIM2}$ does not hold corresponds to a state in which some abnormality is occurring irrespective of the value of $i_\gamma^*$. Thus, operating the abnormality detector 21 according to the flow shown in FIG. 7 causes no problem. If $i_\delta^*$ and $i_\delta^*$ are both equal to zero, however, even if the detected angle $\theta'$ has a large deviation, the relation $I_{LIM1}\leq I_B\leq I_{LIM2}$ normally holds. Accordingly, to reliably distinguish and detect whether or not the detected angle $\theta'$ has a large deviation, in step S21, it may instead be checked whether or not the condition "$i_\delta^*=0$ and simultaneously $i_\gamma^*<0$" holds. In that case, if the condition "$i_\delta^*=0$ and simultaneously $i_\gamma^*<0$" holds, the flow proceeds to step S22; if the condition "$i_\delta^*=0$ and simultaneously $i_\gamma^*<0$" does not hold, the flow repeats step S21.

Application to a Vehicle: In the manner described above, the angle corrector 15 performs the angle correction processing and the abnormality detector 21 performs the abnormality detection processing. Their processing can be performed in a vehicle (unillustrated) furnished with the motor drive system shown in FIG. 3 when it is being driven. The vehicle runs by the rotation of the motor 1.

For example, suppose that the accelerator of the vehicle is turned on and then, after the rotation speed of the motor 1 has been accelerated to reach the flux-weakening region, the accelerator of the vehicle is turned off. Now, $i_\delta^*$ is made equal to zero and, since the vehicle will for a period run by inertia in the flux-weakening region, $i_\gamma^*$ is made negative. During that period, by monitoring the detected current $I_B$, it is possible to adjust the angle correction value $\theta_C$ and also to perform the abnormality detection processing. For another example, suppose that, as a result of the vehicle running down a slope with the accelerator off, the flux-weakening region is reached. Also in this case, it is possible to adjust the angle correction value $\theta_C$ and to perform the abnormality detection processing. Here, the turning-on of the accelerator denotes an operation made on the vehicle to accelerate it by driving the motor 1; the turning-off of the accelerator denotes an operation made on the vehicle to prohibit it from accelerating by driving the motor 1 (that is, an operation to stop driving the motor 1). Even when the accelerator is off and the motor 1 is not being driven, the vehicle may accelerate as when running down a slope.

Modifications and Variations

In connection with the embodiment described above, modified examples or supplementary explanations will be given below in Notes 1 to 4. Unless inconsistent, any part of the contents of these notes may be combined with any other.

Note 1: Any values to be derived that are mentioned in the above description—including the various specified values ($i_\gamma^*$, $i_\delta^*$, $v_\gamma^*$, $v_\delta^*$, etc.) and quantities of state ($i_\gamma$, $i_\delta$, etc.) —may be derived in any manner. Specifically, for example, such values may be derived by calculation within the motor control device 3, or may be derived from previously set table data.

Note 2: In the embodiment described above, the phase current sensor 11 is used to directly detect the U-phase current $i_u$ and the V-phase current $i_v$; instead, it is possible to reproduce the U-phase current $i_u$, the V-phase current $i_v$, and the W-phase current $i_w$ from the detected current $I_B$ and then calculate $i_\gamma$ and $i_\delta$ from them.

Note 3: Part or all of the functions of the motor control device 3 are realized with software (programs) incorporated into a general-purpose microcomputer or the like. In a case where the motor control device 3 is realized with software, the block diagram showing the different functional blocks of the configuration of the motor control device 3 is to be understood as a functional block diagram. Needless to say, the motor control device 3 may be formed not with software (programs) but with hardware alone or with a combination of software and hardware.

Note 4: In the embodiment described above, the angle detector for detecting the angle of the rotor of the motor 1 includes the rotor angle detector 14 (see FIG. 3). This angle detector may be thought of as further including the angle sensor 12. In the embodiment described above, the current detector for detecting, as the detected current $I_B$, the current flowing out of or into the direct-current source 31 includes the A/D converter 22 (see FIG. 3). This current detector may be thought of as further including the current sensor 32.

The present invention is suitable for all kinds of electric devices employing a motor; for example, it is suitable for electric cars that are driven by the rotation of a motor, and compressors and the like used in air conditioners and the like.

What is claimed is:

1. A motor control device for controlling driving of a motor having a permanent magnet provided at a rotor of the motor so as to control rotation of the rotor, the motor control device comprising:
    an angle detector that detects an angle of the rotor by use of an angle sensor:
    a current detector that detects, as a detected current, an outflow current from or an inflow current to a direct-current power source that serves as a source for driving the motor; and
    an angle corrector that corrects the detected angle based on the detected current,
    wherein the driving of the motor is controlled by use of a corrected angle obtained through correction by the angle corrector
    wherein, when it is defined that an axis parallel to a direction of a magnetic flux produced by the permanent magnet is a d-axis; that an axis assumed, for control purposes, to correspond to the d-axis is a γ-axis; and that an axis perpendicular to γ-axis is a δ-axis, the motor control device further comprises a specified current value generator that generates a target γ-axis current value and a target δ-axis current value at which a γ-axis component and a δ-axis component of a supply current to the motor are supposed to be,
    wherein the angle corrector finds an angle correction value based on the detected current as detected when the target δ-axis current value is zero and simultaneously the target γ-axis current value is negative, and finds the corrected angle based on the angle correction value and the angle detected by the angle detector.

2. The motor control device according to claim 1, wherein the angle corrector finds the angle correction value such that the detected current as detected when the target δ-axis current value is zero and simultaneously the target γ-axis current value is negative is equal to a predetermined value or is in a predetermined range including the predetermined value.

3. The motor control device according to claim 1, further comprising an abnormality discriminator that checks whether or not detection by the angle detector is abnormal based on the detected current.

4. The motor control device according to claim 1, wherein, when it is defined that an axis parallel to a direction of a magnetic flux produced by the permanent magnet is a d-axis; that an axis assumed, for control purposes, to correspond to the d-axis is a γ-axis; and that an axis perpendicular to the γ-axis is a δ-axis, the motor control device further comprises a specified current value generator that generates a target δ-axis current value at which a δ-axis component of a supply current to the motor is supposed to be, and
    an abnormality discriminator that checks whether or not detection by the angle detector is abnormal based on the detected current as detected when the target δ-axis current value is zero.

5. The motor control device according to claim 4, wherein the abnormality discriminator finds the detection by the angle detector to be abnormal when the detected current as detected when the target δ-axis current value is zero is out of a predetermined normal current range.

6. A motor drive system, comprising:
    a motor;
    an inverter that drives the motor; and
    a motor control device according to claim 1, wherein the motor control device controls driving of the motor by controlling the inverter.

7. A motor control device for controlling driving of a motor having a permanent magnet provided at a rotor of the motor so as to control rotation of the rotor, the motor control device comprising:
    an angle detector that detects an angle of the rotor by use of an angle sensor; and
    a current detector that detects, as a detected current, an outflow current from or an inflow current to a direct-current power source that serves as a source for driving the motor,
    the driving of the motor being controlled by use of the detected angle,
    wherein the motor control device further comprises an abnormality discriminator that checks whether or not detection by the angle detector is abnormal based on the detected current,
    wherein, when it is defined that an axis parallel to a direction of a magnetic flux produced by the permanent magnet is a d-axis; that an axis assumed, for control purposes, to correspond to the d-axis is a γ-axis; and that an axis perpendicular to the γ-axis is a δ-axis, the motor control device further comprises a specified current value generator that generates a target δ-axis current value at which a δ-axis component of a supply current to the motor is supposed to be,
    wherein the abnormality discriminator checks whether or not the detection by the angle detector is abnormal based on the detected current as detected when the target δ-axis current value is zero.

8. The motor control device according to claim 7, wherein the abnormality discriminator finds the detection by the angle detector to be abnormal when the detected current as detected when the target δ-axis current value is zero is out of a predetermined normal current range.

9. A motor drive system, comprising:
    a motor;
    an inverter that drives the motor; and
    a motor control device according to claim 7, wherein the motor control device controls driving of the motor by controlling the inverter.

* * * * *